United States Patent [19]

Saxe

[11] 4,407,565

[45] Oct. 4, 1983

[54] LIGHT VALVE SUSPENSION CONTAINING FLUOROCARBON LIQUID

[75] Inventor: Robert L. Saxe, New York, N.Y.

[73] Assignee: Research Frontiers Incorporated, Plainview, N.Y.

[21] Appl. No.: 252,757

[22] Filed: Jan. 16, 1981

[51] Int. Cl.³ .............................................. G02F 1/01
[52] U.S. Cl. ................................ 350/374; 252/582; 252/583; 252/585; 350/356; 350/362; 350/397
[58] Field of Search ............... 252/582, 583, 585, 589; 350/356, 362, 374, 397

[56] References Cited

U.S. PATENT DOCUMENTS 4,247,175 1/1981 Saxe .................................... 350/362
4,270,841 6/1981 Saxe .................................... 350/356

FOREIGN PATENT DOCUMENTS 2391767 1/1979 France ................................. 252/582
53-144895 12/1978 Japan .................................. 252/582

OTHER PUBLICATIONS

Wertheim, Textbook of Organic Chemistry, 3rd Ed., McGraw-Hill Book Co., Inc., New York, 1951, pp. 736 and 737.

*Primary Examiner*—Leland A. Sebastian
*Attorney, Agent, or Firm*—Jacobs & Jacobs

[57] ABSTRACT

In a light valve, comprising a cell containing a suspension of particles in a liquid suspending medium, the improvement wherein said light valve suspension comprises particles of a perhalide of an alkaloid acid salt or a light-polarizing metal halide or perhalide suspended in said liquid suspending medium and a protective polymer effective to inhibit agglomeration of said particles dissolved in said liquid suspending medium, said liquid suspending medium comprising an electrically resistive, inert, low molecular weight, liquid fluorocarbon polymer having a specific gravity at room temperature of at least about 1.5 and having at least about 50% of its atoms constituted by halogen atoms, at least 60% of said halogen atoms being fluorine and the balance chlorine and/or bromine, and an electrically resistive organic liquid miscible with the fluorocarbon liquid, said fluid suspending medium being operable to suspend said particles in substantial gravitational equilibrium.

26 Claims, No Drawings

LIGHT VALVE SUSPENSION CONTAINING FLUOROCARBON LIQUID

The present invention relates to light valves and more particularly to improvements in the liquid suspension of particles contained within the light valve cell.

Light valves have been used for over forty years for modulation of light. In Dr. Edwin Land's U.S. Pat. No. 1,955,923, the light valve was defined as a cell formed of two transparent sheets of insulating material spaced apart a small distance and containing a suspension of small particles in a liquid suspending medium. As a practical matter, the suspension also includes a polymeric stabilizer dissolved in the liquid suspending medium to prevent agglomeration of the particles. Nitrocellulose was proposed as a polymeric stabilizer in the beginning of the development of light valves. Recently, U.S. Pat. No. 4,164,365 disclosed polymeric stabilizers in the form of copolymers.

In the absence of an applied electrical field, the particles in the liquid suspension exhibit random Brownian movement, and hence a beam of light passing into the cell is reflected, transmitted or absorbed, depending upon the nature and concentration of the particles and the energy content of the light. When an electrical field is applied through the suspension in the light valve, the particles become aligned and for many suspensions most of the light can pass through the cell.

Light valves have been extensively described in the literature. See U.S. Pat. Nos. 1,955,923, 1,963,496, 3,512,876 and 3,773,684. In the early days of television, Donal, Langmuir and Goldmark thoroughly investigated the use of light valves in black and white as well as color television. See U.S. Pat. Nos. 2,290,582, 2,481,621, 2,528,510 and 2,645,976. A more modern use of the light valve is as an alpha-numeric display. Light valves have also been proposed for use in windows, eye-glasses and the like to control the amount of sunlight passing therethrough.

A wide variety of liquids have been suggested as all or part of the light valve liquid suspending medium to suspend the small particles and dissolve the polymeric stabilizer, such as certain esters, nitrobenzene, oils and other liquids. See U.S. Pat. Nos. 1,961,664, 2,290,582 and others. Similarly, a wide variety of inorganic and organic particles have been suggested for use in the light valve, such as mica, aluminum, graphite, metal halides and perhalides of alkaloid acid salts. While the prior art light valves have been successful to a greater or lesser degree in modulating light and preventing agglomeration of the particles during repeated ON-OFF cycles, nevertheless it has not yet heretofore been possible to provide a liquid suspension for a light valve that is in gravitational equilibrium, and hence, over a long period of time settling of particles has been observed in prior art light valves. This manifests itself in a density gradient in the cell, with the upper part of the cell being less dense than the lower part. In extreme cases, there may not be sufficient particle density in the upper portion of the cell to give sufficient contrast between the ON and OFF states.

The present invention now provides a light valve comprising a cell containing a gravitationally stable light valve suspension. In particular, the light valve suspension comprises particles of a perhalide of an alkaloid acid salt or of a light-polarizing metal halide or perhalide suspended in a liquid suspending medium and a polymeric stabilizer effective to inhibit agglomeration of the particles dissolved in said liquid suspending medium, the liquid suspending medium comprising an electrically resistive, inert, low molecular weight, fluorocarbon liquid described in detail hereinafter having a specific gravity at room temperature (20° C.) of at least about 1.5, and an electrically resistive organic liquid miscible with the fluorocarbon liquid, the suspension being in substantial gravitational equilibrium.

Halogenated liquids have been proposed for use in a light valve suspension in my copending application Ser. No. 956,417, filed Oct. 31, 1978, entitled "Light Valve Containing Improved Light Valve Suspension", now U.S. Pat. No. 4,247,175, issued Jan. 27, 1981. However, neither my copending application nor any of the prior art of which I am aware discloses or suggests the use of a light valve liquid suspension as defined in the appended claims.

The particles in the liquid suspension are preferably perhalides of alkaloid acid salts, preferably those that are light-polarizing. (The term "alkaloid" is used herein to mean an organic nitrogenous base, as defined in Hackh's Chemical Dictionary, Fourth Edition, McGraw-Hill Book Company, New York, 1969). Preferably, the alkaloid moiety is a quinine alkaloid, as defined in Hackh's Chemical Dictionary, supra. U.S. Pat. Nos. 2,178,996 and 2,289,712 refer in detail to the use of perhalides of quinine alkaloid acid salts and these are useful in the present invention.

Examples of useful perhalides of alkaloid acid salts include perhalides of acid salts of heterocyclic organic nitrogenous bases such as pyridine, picoline, diphenyl oxazole, quinoline and quinaldine; of quinine, cinchonidine, hydrocinchonidine, hydrocinchonine and of other quinine alkaloids; and of toluidine and the like.

Most preferably, the perhalide of an alkaloid acid salt is a hydrogenated perhalide of a quinine alkaloid acid salt, such as dihydrocinchonidine sulfate periodide, as described in U.S. Pat. No. 4,131,334, issued Dec. 26, 1978. Quinine bisulfate periodide (herapathite) is also useful.

Alternatively, the particles can be a light-polarizing metal halide or perhalide, such as cupric bromide or purpureocobaltchloride sulfate periodide, as, e.g., in U.S. Pat. No. 1,956,867 to Land.

The shape of the particles used in the light valve suspension should be such that in one orientation they intercept more light than in another orientation. Particles which are needle-shaped, rod-shaped, lath-shaped, or in the form of thin flakes, are suitable. Preferably, the particles are light-polarizing crystals because a relatively small concentration of them in suspension can provide a relatively large change in optical density between the activated and unactivated states of the light valve.

The fluorocarbon liquid used in the present invention is a liquid, low molecular weight fluorocarbon polymer. To obtain the polymer in the liquid state, it will usually be an oligomer, and the oligomer may be a homopolymer, copolymer or telomer. Suitable fluorocarbon liquids include low molecular weight homopolymers of chlorotrifluoroethylene, bromotrifluoroethylene, and hexafluoropropylene, copolymers of tetrafluoroethylene and hexafluoropropylene, polyfluoroalkoxy polymers having a backbone composed of $-CF_2-$ units and pendant $-OC_nF_{2n+1}$ groups, where n is generally from 1 to 4, and the like. In each case, the fluorocarbon liquid will have at least about 50%, preferably at least about 60%, of its total atoms constituted by halogen atoms, at least about 60%, and preferably at least about 75% of the halogen atoms being fluorine atoms and the balance chlorine and/or bromine atoms.

The fluorocarbon liquid must be electrically resistive and must have a specific gravity at room temperature of at least about 1.5, preferably about 1.7 and higher, in order to provide the basis for providing a suspension in substantial gravitational equilibrium. Final adjustment of the specific gravity of the liquid suspending medium is accomplished by the use of the organic liquid miscible with the fluorocarbon liquid, as will be described in detail below. Moreover, the fluorocarbon liquid must be chemically inert so as not to adversely affect the particles in the suspension or any part of the light valve, such as spacers, sealants and coatings on the walls of the light valve cell.

In addition to these requirements, it is desirable that the fluorocarbon liquid have a high boiling point, such as above about 100° C., and hence low vapor pressure so that the light valve cell will not "bulge" at high temperature due to build up of internal pressure. The fluorocarbon liquid should also be safe to use, and hence preferably it will be non-flammable and of little or no toxicity. Furthermore, it is advantageous for the fluorocarbon liquid to have a pour point of −50° C. or below, preferably much lower than about −50° C., so that it will remain liquid over an operating range of −40° to 85° C., a range that encompasses virtually all light valve applications. For certain applications, e.g., displays used only indoors, a narrower range may be permissible.

In most cases, the fluorocarbon liquid will be of low viscosity at room temperature, particularly where use of the light valve at lower temperatures is cotemplated, e.g., an outdoor display or window. This will allow the light valve to have a reasonably quick response when it is turned ON and OFF even at the low end of the desired temperature range. In some cases, a high viscosity may be appropriate.

In general, the fluorocarbon liquid will be a polymer having only a few repeating units of the monomeric fluorocarbon, such as a dimer, trimer or tetramer. In some cases, more than four units can be present, there being no criticality in the number of repeat units so long as the polymer remains in liquid form. Often, the polymerization process will provide a mixture of oligomers, such as a mixture of dimer and trimer, and the mixture can be used as such without separation into distinct polymeric species if the mixture has the desired properties. As is known, the higher the degree of polymerization, the higher the molecular weight, boiling point, viscosity and pour point. Also, the more carbon atoms in the monomer, the more rapidly these properties will increase with increasing degree of polymerization. Given these trends and the preferred characteristics of the fluorocarbon liquid, selection of a particular liquid can be made empirically without undue experimentation.

Presently preferred for use as the fluorocarbon liquid are oligomers of bromotrifluoroethylene and chlorotrifluoroethylene. These low molecular weight polymers are odorless, non-flammable, inert, electrically resistive, non-corrosive liquids of low toxicity, which are prepared by polymerizing bromotrifluoroethylene or chlorotrifluoroethylene and stabilizing the polymer to provide completely halogenated terminal groups. Halocarbon Products Corporation of Hackensack, New Jersey, sells liquid oligomers of bromotrifluoroethylene and chlorotrifluoroethylene under the designations BFC Fluid and Halocarbon Oil, respectively.

Low molecular weight liquid oligomers of chlorotrifluoroethylene having a specific gravity at room temperature of from about 1.6 to about 2.0 and of suitable chemical and physical properties can be prepared by polymerization of chlorotrifluoroethylene to the desired degree. The terminal groups should be completely halogenated and inert to provide greatest stability. Halocarbon Oils sold by Halocarbon Products Corporation under the designation 0.8/100, 1.8/100, 4-11, 11-14, and 11-21 are of relatively low viscosity. Such polymers are also high boiling, with initial boiling points of 135° C. to 260° C. and hence will have low vapor pressure. A more complete description of the relevant properties of these preferred polymers is set forth in the following table. Higher molecular weight liquid polymers of chlorotrifluoroethylene are also commercially available and these will have higher viscosities.

| Designation | 0.8/100 | 1.8/100 | 4-11 | 11-14 | 11-21 |
|---|---|---|---|---|---|
| Minimum Initial Boiling Point, OC/760mm | 135 | 205 | 221 | 238 | 260 |
| Flash Point and Fire Point | — | — | none | — | — |
| Pour Point,[2] °C. | −130 | −93 | −73 | −70 | −37 |
| Cloud Point,[3] °F. | <−200 | <−135 | <−125 | <−125 | −95 |
| Viscosity[4] | | | | | |
| Centistokes @ −65° F. | 5.7 | 143 | | | |
| Centipoises | 10.3 | 229 | | | |
| Centistokes @ 100° F. | 0.79 | 1.9 | 4.2 | 6.3 | 33 |
| Centipoises | 1.35 | 3.5 | 7.8 | 11.8 | 63 |
| Centistokes @ 160° F. | 0.54 | 1.1 | 1.9 | 2.6 | 8.0 |
| Centipoises | 0.89 | 1.9 | 3.4 | 4.7 | 14.8 |
| Centistokes @ 210° F. | | 0.79 | 1.2 | 1.6 | 3.8 |
| Centipoises | 1.4 | 2.1 | 2.8 | 6.8 | |
| Specific Gravity[5] | | | | | |
| 100° F. | 1.71 | 1.82 | 1.85 | 1.87 | 1.90 |
| 160° F. | 1.65 | 1.76 | 1.80 | 1.82 | 1.85 |

| Designation | 0.8/100 | 1.8/100 | 4–11 | 11–14 | 11–21 |
|---|---|---|---|---|---|
| 210° F. | 1.60 | 1.71 | 1.75 | 1.77 | 1.80 |

[1]Measured in vapor phase
[2]ASTM D97 + 10° F.
[3]ASTM D2500-66, ± 10° F.
[4]ASTM D455-74, specification range ± 10%
[5]Gay-Lussac pycnometers, specification range ± 0.01 g/ml Of the halocarbon oils set forth above, it is presently preferred to use Halocarbon Oil 0.8/100.

Low molecular weight liquid polymers of bromotrifluoroethylene generally have a specific gravity at room temperature in the approximate range of from 2.2 to more than 2.4, depending on the degree of polymerization and the polymerization temperature. A liquid having a high specific gravity is advantageous when particles having a relatively high specific gravity are employed in the light valve suspension or when it is desirable to use less of the fluorocarbon liquid. When liquid polymers of bromotrifluoroethylene are employed, the heat stability of the telomer is improved if the terminal groups of the polymers contain as the halogen atoms only chlorine and fluorine, and preferably only fluorine. A mixture of fluorocarbon liquids can be used, such as a mixture of chlorotrifluoroethylene and bromotrifluoroethylene oligomers.

The light valve suspension according to the invention includes a protective polymer or polymers to prevent agglomeration of the particles during use of the light valve. As is known, the protective polymer must be soluble in the liquid suspending medium and must be capable of bonding to the particles. In some cases, two protective polymers can be used, wherein a first polymer bonds to the particle, but is insoluble (or less soluble than desired) in the liquid suspending medium, and the second polymer bonds to the first polymer and is sufficiently soluble in the liquid suspending medium so that the particle-protective polymers complex is well dispersed in the liquid suspending medium. The protective polymer or polymers act to form a large zone of steric protection around the particles and thus inhibit agglomeration.

Copolymers of the type described in U.S. Pat. No. 4,164,365 can be used as the protective polymer. These are copolymers of at least two different monomers, at least one of the monomers having a sterically unhindered functional hydroxy and/or acidic group, and at least one of said monomers having a branched group, the distance from the backbone of the copolymer to said sterically unhindered functional group most distant from the backbone being less than the distance from the backbone to the terminal group of said branched group, the branched groups in said copolymer being sufficiently soluble so that the copolymer as a whole will substantially dissolve in the liquid suspending medium of a light valve suspension.

The functional groups carried by the copolymer are provided by a copolymerizable monomer containing such groups. Acidic groups are thus provided by using ethylenically unsaturated acids, such as acrylic acid, methacrylic acid, fumaric acid, mesaconic acid, maleic acid or the like, or acrylonitrile and other acidic monomers. Hydroxy groups can be provided by hydroxyalkyl esters of ethylenically unsaturated acids such as hydroxy propyl acrylate or methacrylate and the like. In a similar fashion, other acidic groups, such as sulfonic acid groups, functional groups, such as cyano groups, isocyanato groups and the like are provided by using an appropriately substituted ethylenically unsaturated monomer. Basic groups, when compatible with the particles, can be provided by amine or amide groups.

The branched monomer for the copolymer is selected as described in my U.S. Pat. No. 4,164,365. Preferably, the branched monomer contains no functional groups that bond to the particle. It is also preferable that the branched monomer constitute a majority of the copolymer by weight and is the monomer of highest molecular weight. Suitable branched monomers include branched alkyl esters of ethylenically unsaturated acids, for example, 2-ethylhexylacrylate, bis-2-ethylhexyl fumarate, 5,5-diethylhexyl acrylate and 3,5,5-trimethyl hexyl acrylate. However, either or both of the functional group-containing monomer and the branched monomer may be an ether or a cyclic monomer. Particularly useful monomers are halogenated monomers, in particular fluorinated monomers, which may aid the copolymer in the attainment of solubility in the liquid suspending medium. Specific copolymers useful in the present invention are set forth in U.S. Pat. No. 4,164,365.

Where nitrocellulose is used as the protective polymer, as is necessary for dihydrocinchonidine sulfate periodide particles, the particle-nitrocellulose complex will not disperse into the liquid suspending medium and, in such cases, the nitrocellulose must be used with an auxiliary organic copolymer, preferably having first pendant, branched, carbon-to-carbon chains optionally interrupted by an oxygen atom and second pendant carbon-to-carbon chains, optionally interrupted by an oxygen atom, carrying an hydroxy group, the most distant hydroxy group being closer to the backbone of the copolymer than the terminal branched groups. Useful copolymers are copolymers of hydroxy alkyl acrylates (wherein alkyl is of 1 to 3 carbon atoms) and sec- and tert alkyl acrylates (wherein alkyl is of 4–12 carbon atoms). A third comonomer, such as an unsaturated acid, can be used, but is usually not needed. Copolymers useful as the auxiliary copolymer can be prepared by the procedures of U.S. Pat. No. 4,164,365.

The hydroxy groups of the auxiliary copolymer associated with the particle-nitrocellulose complex and the resultant particle-nitrocellulose-copolymer ternary complex can be well dispersed into the liquid suspending medium. Generally, as the hydroxy content of the auxiliary copolymer increases, its affinity to the nitrocellulose increases but the solubility of the protective polymers in the fluorocarbon liquid decreases. The organic liquid miscible with the fluorocarbon polymer assists in dissolving the protective polymers into the liquid suspending medium. A useful working range for the auxiliary copolymer is from about 10 to about 30% of the hydroxy monomer and from about 90 to about 70% of the branched monomer. Presently preferred is a 10–30% 2-hydroxypropyl acrylate/70–90% 2-ethylhexyl acrylate copolymer of 50,000 to 300,000 molecular weight.

The electrically resistive organic liquid miscible with the fluorocarbon liquid serves two primary purposes. First, and most importantly, the use of the miscible organic liquid enables one to match the specific gravity of the liquid suspending medium to that of the particle-protective polymer complex. Generally, such complexes have a specific gravity less than that of the fluorocarbon liquid, and the lower specific gravity miscible organic liquid functions to reduce the specific gravity of the liquid suspending medium. Second, the miscible organic liquid assists in dispersing the particle-protective polymer complex into the liquid suspending medium, particularly where the polymer or polymers are insufficiently soluble in the fluorocarbon liquid, as is the case of nitrocellulose.

A wide variety of organic liquids can be used as the miscible organic liquid. Useful liquids include esters of aliphatic and aromatic acids and alcohols, e.g. alkyl or phenyl acetates, such as isopentyl acetate and p-nonlphenylacetate, dioctylphthalate, diisodecyl adipate and dioctyl sebacate, aromatic hydrocarbons, e.g. benzene and toluene, and silicones (organosiloxanes). Generally, the miscible organic liquid will be present in an amount effective to provide gravitational equilibrium and to assist in dispersing the particle-protective polymer complex in the liquid suspending medium; use of amounts larger than the effective amount are not needed for solubility purposes and may unduly lower the specific gravity of the fluorocarbon liquid/auxiliary liquid mixture. It is presently preferred that the fluorocarbon liquid be at least about 40%, preferably at least about 60% by weight of the liquid suspending medium, and the amount of the miscible organic liquid is thus selected accordingly. Even within these ranges, care must be taken to properly balance solubility and gravitational requirements. Thus, the use of a particle-polymer complex whose polymer moiety has only marginal solubility in the fluorocarbon liquid may require so large an amount of miscible organic liquid as to make the specific gravity of the liquid suspending medium too low for gravitational purposes. This can occur in view of the fact that the miscible organic liquids generally have a specific gravity of about 0.85 to 1.2.

Generally speaking, each light valve suspension will have one specific gravity at which gravitational equilibrium will be reached. Ideally, a suspension in perfect equilibrium will never settle. In reality, slight deviations from the ideal can be tolerated, and slight compromises are inevitable. It is also clear that the specific gravity at which gravitational equilibrium is reached for a given suspension depends upon the choice of particle, protective polymer, liquid suspending medium and any other material that may be dissolved in the liquid suspending medium, and hence the specific gravity for gravitational equilibrium will be different from suspension to suspension according to the particular parameters of a given suspension. Likewise, if the amount of protective polymer used in a given suspension is changed, for example to change the viscosity of the suspension so as to increase or reduce the response time, the specific gravity needed for gravitational equilibrium will also be changed.

Gravitational equilibrium of a light valve suspension is readily determined by means of a simple test. In this test, 10 ml of the light valve suspension is centrifuged in a centrifuge tube at 2500 rpm for one hour. Gravitational equilibrium is obtained if less than 10% of the particles settle after the centrifuge tubes are removed from the centrifuge.

As can be seen, to obtain a gravitationally stable light valve suspension, the particles, protective polymer, fluorocarbon liquid and miscible organic liquid must be carefully selected with respect not only to their specific gravities, but to their physical, chemical, electrical and optical properties as well. For example, there is no point in providing a gravitationally stable light valve suspension in which the particles will agglomerate after only a few cycles of ON-OFF operation. Thus, the light valve suspension of the present invention brings together the sometimes conflicting requirements of particles, protective polymer and liquid suspending medium to provide a gravitationally stable, non-agglomerating, light valve suspension having as rapid a response time as desired and as wide a range of operating temperatures as desired.

In this specification and in the appended claims, all parts and proportions are by weight unless expressly stated otherwise.

EXAMPLE I

A. Preparation of dihydrocinchonidine sulfate periodide-(DCSI)-nitrocellulose complex Dihydrocinchonidine sulfate was prepared by dissolving 1 part of dihydrocinchonidine in 1.5 parts of methanol, adding 0.32 parts of 97% $H_2SO_4$ to the solution and evaporating the solution to dryness. The resulting dihydrocinchonidine sulfate is in the form of a white powder.

Solution A was prepared by dissolving 2.12 g. of dihydrocinchonidine sulfate in 10.0 g. 2-ethoxyethanol, 5.0 g. water and 3.0 gram of $CHCl_3$. Solution B was a 33⅓% solution of nitrocellulose in 2-ethoxyethanol. The nitrocellulose is a 50:50 mixture of low viscosity (18–25 cps) and high viscosity (15–20 second) types. The nitrocellulose must be dried of all isopropanol and/or other solvent before dissolving it in the 2-ethoxyethanol. Failure to do so will cause large particles of DCSI to be formed later in the procedure herein described.

Solution A and 20.0 g. of solution B were mixed to form Solution C.

Solution D was prepared by dissolving 0.3 g. hydrated $CaI_2$ in 10.0 g. water and then adding 1.54 g. $I_2$ and 21.0 g. tricresylphosphate and shaking for 15 minutes.

Solution C was combined with Solution D with vigorous mixing in a Waring Blender, while stirring with a polyethylene spatula along the inside walls of the cup, counter to the direction of blender flow. In 2–4 minutes a viscous paste was formed having a deep blue color with golden flecks. The paste was spread as a 12 mil film and dried several hours in air until no odor from volatile solvents was detectable. The dried paste was placed in an electric mortar grinder and mortar ground for about ½ hour. Then with the mortar machine still grinding, 50 g. of isopentyl acetate were added followed by an additional hour of mixing in the mortar machine. The resulting suspension was then removed from the mortar and subjected to ultrasonic agitation for 17 hours.

B. Preparation of Liquid Suspension of DCSI

Forty grams of the suspension from Part A was mixed while shaking with 90 g. isopentyl acetate. The diluted suspension was divided among four 50 ml centrifuge tubes and then centrifuged for about 10 hours at 2500 rpm, causing most of the particles to come down near to the bottom of the tubes. The clear liquid above the particles in each tube was discarded, and 7 g. of isopentyl acetate was then added to each tube. The contents in each tube were stirred with a spatula and then subjected to ultrasonic agitation for 17 hours, after which the contents of the four tubes were divided between two 25 ml centrifuge tubes. The 25 ml tubes were centrifuged for about 6 hours at 2500 rpm, after which most of the particles again came down near to the bottom of the tubes and the liquid above the particles was discarded.

Two grams of isopentyl acetate were then added to each centrifuge tube and the contents stirred with a spatula. The centrifuge tubes were subjected to ultrasonic agitation for 17 hours, after which the contents from the two centrifuge tubes were consolidated into one 10 ml centrifuge tube, and centrifuged for about 60 minutes at 2500 rpm. The top portion of the liquid suspension was poured into a vial and saved, while the bottom portion was discarded.

A portion of the saved suspension was poured into a test cell having a spacing between opposed walls of 33 mils. The suspension was subjected to an electric field of 30 volts per mil peak-to-peak at a frequency of 10 KHz. The optical density of the cell with no field applied was 3.0 and the decay time was 50 milliseconds. Decay time is measured by applying the electric field across the suspension for 40 milliseconds and then continuously measuring the optical density from the time the field is discontinued until the optical density again reaches 3.0. The time for the suspension to return to the 3.0 optical density is the decay time. This suspension had a tendency to settle on standing after long periods of use, and hence was not in gravitational equilibrium. However, it performed quite well as a light valve suspension in all other respects.

C. Addition Of Fluorocarbon To The Suspension

Four grams of the DCSI suspension prepared in Part B and four grams of a 20% solution of a copolymer of 2-ethylhexylacrylate (85%) and 2-hydroxypropyl acrylate (15%) in dioctyl adipate were mixed with stirring in a 50 ml beaker. Halocarbon Oil 1.8/100 was slowly added to the beaker, with stirring, and the specific gravity of the suspension was monitored. The addition of the Halocarbon Oil was stopped when the specific gravity of the suspension was 1.54, corresponding to about 31 grams of Halocarbon Oil. From other tests it was determined that with DCSI-nitrocellulose-2-ethylhexyl acrylate/2-hydroxypropyl acylate copolymer and Halocarbon Oil 1.8/100, a specific gravity of 1.54 for the suspension means that gravitational equilibrium has been reached. Finally, the suspension is ultrasonically agitated for at least 17 hours as a preferred technique.

The resulting suspension was checked for gravitational equilibrium by the test method described above, and settling of less than 5% of the particles was observed.

A test cell having a 5-mil spacing between opposed transparent coatings was filled with the suspension and tested for use as a light valve suspension. The results were:

Optical density of 2.3 with no applied voltage.
Contrast ratio of 20:1 at 40 volts RMS and 60 Hz.
Decay time of less than 600 milliseconds.

These results show that the gravitationally stable suspension is eminently suitable for use in a light valve because it gives a dense image when the light valve is OFF, it provides high contrast between the ON and OFF states and it has a very fast response time thus enabling the light valve to open and close rapidly.

EXAMPLE II

Solution A was prepared by dissolving 1.65 g. of quinine bisulfate in a mixture of 5 g. methanol, 5 g. chloroform and 10 g. n-propanol, and stirring until clear. To this solution was added 3 g. of a copolymer of 2-ethylhexyl acrylate and acrylic acid, 90% and 10% by monomer weight respectively, which was dissolved into the solution.

Solution B was prepared by admixing 0.04 g. $BiI_3$, 0.07 g. $CaCl_2$, 10 g. n-propanol and 0.13 g. of 57% aqueous HI solution, and subjecting the admixture to ultrasonic agitation for about 15 minutes, after which 1.06 g. iodine and 15 g. dioctyl sebacate are added. The resulting solution is ultrasonically agitated for about 1 hour to form Solution B.

Solutions A and Solution B were mixed together at high speed in a Waring Blender, and the resulting paste of quinine bisulfate perhalide is recovered and spread on a glass plate to dry as in Example I. A concentrated suspension of quinine bisulfate perhalide is prepared by dispersing the aforesaid dried paste into 150 grams of isopentyl acetate and further diluted as follows to produce a suspension in gravitational equilibrium:

|  | % |
| --- | --- |
| Concentrated suspension | 4.50 |
| 2-ethylhexyl 2-cyano 3,3-diphenyl acrylate. | 2.96 |
| 1-phenylheptane | 4.70 |
| Halocarbon Oil 1.8/100 | 87.84 |
|  | 100.00% |

When tested in a test cell having a spacing of 33 mils between the electrodes, the suspension has an optical density of 3.0 when unactivated and 1.0 when activated by a voltage of 500 volts peak-to-peak. The suspension has a specific gravity of approximately 1.70.

I claim:

1. In a light valve, comprising a cell containing a suspension of particles in a liquid suspending medium, the improvement wherein said light valve suspension comprises particles of a perhalide of an alkaloid acid salt or of a light-polarizing metal halide or perhalide suspended in said liquid suspending medium and a protective polymer effective to inhibit agglomeration of said particles dissolved in said liquid suspending medium, said liquid suspending medium comprising an electrically resistive, chemically inert, low molecular weight, liquid fluorocarbon polymer having a specific gravity at room temperature of at least about 1.5 and having at least about 50% of its atoms constituted by halogen atoms, at least 60% of said halogen atoms being fluorine and the balance chlorine and/or bromine, and an electrically resistive organic liquid miscible with the fluorocarbon liquid, said fluid suspending medium being operable to suspend said particles in substantial gravitational equilibrium.

2. The light valve according to claim 1, wherein said fluorocarbon polymer is an oligomer.

3. The light valve according to claim 1, wherein said fluorocarbon polymer is selected from the group consisting of low molecular weight homopolymers of chlorotrifluoroethylene, bromotrifluoroethylene, and hexafluoropropylene, copolymers of tetrafluoroethylene and hexafluoropropylene, and polyfluoroalkoxy polymers having a backbone composed of —CF$_2$+ units and pendant —OC$_n$F$_{2n+1}$ groups, where n is generally from 1 to 4.

4. The light valve according to claim 3, wherein said fluorocarbon polymer has a pour point lower than about −50° C. and a boiling point above about 100° C.

5. The light valve according to claim 3, wherein said fluorocarbon polymer is an oligomer of chlorotrifluoroethylene.

6. The light valve according to claim 5, wherein said oligomer has an initial boiling point in the range of from about 135° C. to about 260° C. and a pour point in the range of from about −70° C. to about −130° C.

7. The light valve according to claim 5, wherein said oligomer has a specific gravity at room temperature of at least about 1.7.

8. The light valve according to claim 5, wherein said oligomer has an initial boiling point in the range of from about 135° C. to about 205° C., a pour point in the range from about −130° C. to about −93° C. and a specific gravity at room temperature in the range from about 1.6 to about 2.0.

9. The light valve according to claim 3, wherein said fluorocarbon polymer is an oligomer of bromotrichloroethylene.

10. The light valve according to claim 9, wherein said oligomer has a specific gravity at room temperature in the range of from about 2.2 to about 2.4.

11. The light valve according to claim 1, wherein at least about 60% of the atoms of said fluorocarbon polymer are constituted by halogen atoms and at least about 75% of said halogen atoms are fluorine and the balance chlorine and/or bromine.

12. The light valve according to claim 1, wherein said miscible organic liquid is selected from the group consisting of esters of aliphatic and aromatic acids and alcohols, aromatic hydrocarbons and silicones.

13. The light valve according to claim 12, wherein said miscible liquid is selected from the group consisting of isopentyl acetate, p-nonylphenylacetate, dioctylphthalate, diisodecyl adipate, dioctyl sebacate, benzene and toluene.

14. The light valve according to claim 1, wherein the liquid fluorocarbon polymer comprises about 40% by weight of the liquid suspending medium.

15. The light valve according to claim 1, wherein the liquid fluorocarbon polymer comprises about 60% by weight of the liquid suspending medium.

16. The light valve according to claim 1, wherein said particles are of a light-polarizing perhalide of a quinine alkaloid acid salt.

17. The light valve according to claim 16, wherein said quinine alkaloid is selected from the group consisting of quinine, cinchonidine, hydrocinchonidine and hydrocinchonine.

18. The light valve according to claim 1, wherein said particles are of dihydrocinchonidine sulfate periodide.

19. The light valve according to claim 1, wherein said particles are of quinine bisulfate periodide.

20. The light valve according to claim 1, wherein said protective polymer comprises nitrocellulose and an auxiliary copolymer having first pendant, branched, carbon-to-carbon chains optionally interrupted by an oxygen atom and second pendant carbon-to-carbon chains, optionally interrupted by an oxygen atom, carrying an hydroxy group, the most distant hydroxy groups being closer to the backbone of the copolymer than the terminal branched groups.

21. The light valve according to claim 20, wherein said auxiliary copolymer is a copolymer of a hydroxy alkyl acrylate (wherein alkyl is of 1 to 3 carbon atoms) and a branched alkylacrylate (wherein alkyl is of 4–12 carbon atoms).

22. The light valve according to claim 1, wherein the protective polymer is a copolymer of at least two different monomers, at least one of said monomers having a sterically unhindered functional acidic and/or hydroxy group for bonding to or associating with said particles, and at least one of said monomers having a branched group, the distance from the backbone of the copolymer to said sterically unhindered functional group most distant from the backbone being less than the distance from the backbone to the terminal group of said branched group, the branched group in said copolymer being sufficiently soluble so that the copolymer as a whole is substantially dissolved in said liquid suspending medium.

23. The light valve according to claim 22, wherein said copolymer is a copolymer of a hydroxyalkyl ester of an ethylenically unsaturated acid and a branched alkyl ester of an ethylenically unsaturated acid.

24. The light valve according to claim 1, wherein said protective polymer is a mixture of polymers effective to prevent agglomeration of said particles.

25. The light valve according to claim 1, wherein said protective polymer comprises a first polymer that bonds to said particles and a second polymer that bonds to the first polymer and is sufficiently soluble in the liquid suspending medium so that the complex of particles and polymers thus formed is dispersed in the liquid suspending medium.

26. The light valve according to claim 25, wherein said first polymer is nitrocellulose and said second polymer is an organic copolymer.

* * * * *